United States Patent [19]

Riding et al.

[11] Patent Number: 5,128,431
[45] Date of Patent: Jul. 7, 1992

[54] PLATINUM CATALYZED HETEROCYCLIC COMPOUND COMPOSITIONS

[75] Inventors: Karen D. Riding, Castleton; James V. Crivello, Clifton Park; Julia L. Lee, Schenectady, all of N.Y.

[73] Assignee: General Electric Company, Waterford, N.Y.

[21] Appl. No.: 473,802

[22] Filed: Feb. 2, 1990

Related U.S. Application Data

[63] Continuation-in-part of Ser. No. 403,214, Sep. 1, 1989, abandoned.

[51] Int. Cl.$^5$ .............................. C08G 77/06
[52] U.S. Cl. ................................. 528/15; 528/26; 528/27; 528/31; 525/100; 525/102; 525/476; 525/478
[58] Field of Search ............ 528/15, 27, 31, 26; 525/478, 100, 476, 102

[56] References Cited

U.S. PATENT DOCUMENTS

| | | | |
|---|---|---|---|
| 3,197,432 | 7/1965 | Lamoreaux | 260/46.5 |
| 3,197,433 | 7/1965 | Lamoreaux | 260/46.5 |
| 3,220,972 | 11/1965 | Lamorewux | 260/46.5 |
| 3,240,754 | 3/1966 | Plueddemann | 528/15 |
| 3,300,418 | 1/1967 | Andres et al. | 528/31 |
| 3,715,334 | 2/1973 | Karstedt | 260/46.5 |
| 3,814,730 | 6/1974 | Karstedt | 260/46.5 |
| 3,884,866 | 5/1975 | Jeram et al. | 260/33.6 |
| 3,996,195 | 12/1976 | Sato et al. | 528/15 |
| 4,083,856 | 4/1978 | Mendicino | 528/27 |
| 4,162,243 | 7/1979 | Lee et al. | 260/37 SB |
| 4,279,717 | 7/1981 | Eckberg et al. | 204/159.13 |
| 4,288,345 | 9/1981 | Ashby et al. | 252/431 R |
| 4,427,801 | 1/1984 | Sweet | 523/212 |
| 4,558,082 | 12/1985 | Eckberg | 524/104 |
| 4,576,999 | 3/1986 | Eckberg | 525/476 |
| 4,617,238 | 10/1986 | Crivello et al. | 428/452 |
| 4,666,745 | 5/1987 | Huhn et al. | 528/15 |
| 4,721,764 | 1/1988 | Fujiki et al. | 528/15 |
| 4,732,932 | 3/1988 | Waldern | 524/862 |
| 4,743,377 | 5/1988 | Ohtsu et al. | 210/635 |
| 4,859,759 | 8/1989 | Maycock et al. | 528/27 |
| 4,912,188 | 3/1990 | Coles | 528/15 |
| 4,927,898 | 5/1990 | King et al. | 528/27 |

OTHER PUBLICATIONS

E. P. Plueddemann and G. Fanger, Epoxyorganosiloxanes Journal of the American Chemical Society, vol. 81, pp. 2632-2635 (1959).

*Primary Examiner*—Melvyn I. Marquis
*Assistant Examiner*—R. Dean, Jr.

[57] ABSTRACT

There is provided a curable composition, comprising:
A. a heterocyclic compound selected from the group consisting of epoxy-functional silicones, epoxy-functional acrylic polymers, and monomers selected from the group consisting of tetrahydrofurans, oxetanes, lactones, spirocarbonates, spiroesters, cyclic sulfur and cyclic nitrogen compounds;
B. an Si-H functional silicon compound; and
C. a platinum catalyst.

There is further provided a method for polymerizing a heterocyclic compound using a platinum catalyst.

27 Claims, No Drawings

PLATINUM CATALYZED HETEROCYCLIC COMPOUND COMPOSITIONS

This application is a continuation-in-part of Application Ser. No. 403,214, filed Sep. 1, 1989, now abandoned.

This invention relates to the polymerization of heterocyclic compounds. More particularly, this invention relates to the platinum-catalyzed polymerization of heterocyclic compounds.

BACKGROUND OF THE INVENTION

Catalytic agents which have been used to catalyze the ring opening polymerization of various heterocyclic compounds, particularly epoxides, include acids, bases, and certain metal complexes such as, for example, organoboron compounds, $FeCl_2$, $ZnEt_2/H_2O$, $AlEt_3/H_2O$, and aluminoporphrins. Reference is made, for example, to Ivin and Saegusa, *Ring Opening Polymerization*, Vol. 1, Elsevier App. Sci. Pub. New York 1984, p. 185; and to May and Tanaka, *Epoxy Resins Chemistry and Technology*, Marcel Dekker, Inc., New York, 1973, p. 283.

Epoxy functional siloxanes may be polymerized by ring opening of the oxirane rings by either UV radiation or heat. Polymerization by UV radiation involves the use of a photocatalyst that, when irradiated with UV light, forms an acid that catalyzes the epoxide. Such reactions are taught by Eckberg in U.S. Pat. No. 4,279,717 and Crivello in U.S. Pat. No. 4,617,238.

Polymerization by heat involves the simple step of heating the epoxy functional siloxanes to a temperature of 120° C. or greater, causing the oxirane rings to open and react. Specific reference is made to E. P. Plueddemann and G. Fanger, *Epoxyorganosiloxanes*, Journal of the American Chemical Society, vol. 81, pp. 2632-2635, 1959.

Platinum-containing catalysts are highly useful catalysts in hydrosilyation reactions, i.e., the addition of Si-H containing compounds to olefin and acetylenic bonds. Reference is made to Aylett, *Organometallic Compounds*, Vol. 1, John Wiley, New York, 1979, p. 107 and to Speir, *Adv. in Org. Chem.*, Vol. 17, p. 407, 1974. It is further known in the art that platinum will catalyze the hydrosilyation reaction between ethylenically unsaturated organic epoxy monomers and Si-H containing compounds. Such reactions are described, for example, in copending, commonly assigned application Ser. No. 332,646, filed Apr. 3, 1989.

The use of platinum catalysts to promote ring opening of heterocyclic polymers provides numerous advantages over catalysts presently used to catalyze polymerizations. These advantages include the use of low levels of catalyst and the low tendency of catalyst residues to induce color, oxidative instability in the final cured resin, or corrosion to metals in contact with the resin. Furthermore, with silicones, the platinum catalysts are less prone to cause reversion of the silicone polymers to cyclic siloxanes.

SUMMARY OF THE INVENTION

The present invention is based on the discovery that platinum catalysts will catalyze the ring opening polymerization of heterocyclic compounds.

The present invention provides a curable composition, comprising:

A. A heterocyclic compound selected from the group consisting of epoxy-functional silicones, epoxy-functional acrylic polymers, and monomers selected from the group consisting of tetrahydrofurans, oxetanes, lactones, spirocarbonates, spiroesters, cyclic sulfur and cyclic nitrogen compounds;
B. an Si-H functional silicon compound; and
C. a platinum catalyst.

The present invention further provides a method for polymerizing a heterocyclic compound using a platinum catalyst.

DETAILED DESCRIPTION OF THE INVENTION

The curable composition of the present invention contains a heterocyclic compound selected from the group consisting of epoxy-functional silicones, epoxy-functional acrylic polymers, and monomers selected from the group consisting of tetrahydrofurans, oxetanes, lactones, spirocarbonates, spiroesters, cyclic sulfur and cyclic nitrogen compounds.

An example of a suitable lactam monomer is epsilon-caprolactam.

An example of a suitable oxetane monomer is 3,3-bis-chloromethyloxetane.

An example of a suitable lactone is epsilon-caprolactone.

An example of a suitable spirocarbonate monomer is 1,4,6,8-tetraoxy[4,4]nonane.

An example of a suitable spiroester monomer is 1,4,6-trioxa[4,4]nonane.

An example of a suitable cyclic sulfur monomer is thiirane.

An example of a suitable cyclic nitrogen monomer is ethyleneimine.

In preferred embodiments of the present invention, the heterocyclic compound is a silicone polymer containing epoxy functionality.

The preferred epoxy functional silicones are polydiorganosiloxanes that are substantially linear dialkylepoxy chain stopped polydialkylsiloxane copolymers optionally comprising internal alkylepoxyliloxy units wherein the alkyl groups are lower alkyl, preferably methyl. Substantially linear trialkylsiloxy endstopped polysiloxane copolymers which comprise at least two internal epoxy functional siloxy units are also within the scope of the invention but are less preferred.

The epoxy-functional silicones useful in the present invention have the general formula:

wherein each R is, individually, a substituted or unsubstituted alkyl group having from about 1 to about 12, and preferably about 1 to about 5 carbon atoms; each $R^1$ is, individually, R or a monovalent epoxy functional organic radical having from about 2 to about 20 and preferably about 2 to about 5, carbon atoms; "a" is from about 0 to about 3, and preferably about 0 to about 2; "b" is from about 0 to about 3 and preferably about 0 to 2; "x" is from about 1 to about 15 and preferably about 1 to about 10; and "y" is from about 1 to about 200 and preferably about 10 to about 100.

In the most preferred embodiment of formula [1] above, R is methyl, $R^1$ is derived from 4-vinyl cyclohexene monoxide, "a" is 1, "x" is about 1 to about 5, and "y" is about 20 to about 80.

It is preferable, though not necessary, that the epoxy functional silicone be used in fluid form in order to obtain a homogeneous mixture of the silicone and catalyst. Silicone resins may be used. However, solvents will then be necessary for complete dispersion of the catalyst which is essential.

The epoxy functionality, $R^1$, in formula [1] above, is obtained by hydrosilation reaction between Si-H groups of a silicon hydride and an ethylenically unsaturated epoxide in the presence of catalytic amounts of a precious metal catalyst, usually platinum. The ethylenically unsaturated epoxides are any vinyl or allyl functional aliphatic or cycloaliphatic epoxy compounds where the olefinic moieties will readily undergo addition reactions with Si-H functional groups. Commerically obtainable examples of such compounds include allyl glycidyl ether, methallyl glycidyl ether, 1-methyl-4-isopropenyl cyclohexeneoxide (limoneneoxide; SCM Corp.), 2,6-dimethyl-4-vinylcyclohexeneoxide (Viking Chemical Co.), and 4-vinyl cyclohexene monoxide. 4-vinyl cyclohexene monoxide is the preferred epoxide starting material.

Silicon hydride-containing starting materials suitable for making the epoxy functionality include any silicon compound derived from at least two organosiloxane units and having terminal and/or pendant Si-H groups. The Si-H functional silicon compound is capable of reacting with the olefinic moieties of the above-mentioned epoxides via addition reaction. Examples of suitable Si-H functional silicon compounds include 1,1,3,3-tetraalkyldisiloxane, dialkylhydrogensiloxy-endstopped polydialkylsiloxane, polydialkylalkylhydrogen-siloxane copolymer, and trialkylsiloxy-endstopped polydialkylalkylhydrogensiloxane copolymer comprising at least two alkylhydrogen siloxy groups. Other examples of Si-H containing silicon compounds include 1,1,3,3-tetramethyldisiloxane, 2,4,6,8-tetramethylcyclotetrasiloxane, methyldimethoxysilane, triethylsilane, and methyldiethoxysilane. The preferred Si-H functional silicon compound as a starting material for making the epoxy functional silicone used in the present invention is 1,1,3,3-tetramethyldisiloxane.

Precious metal hydrosilation catalysts which are suitable for use in making the epoxy functional silicone used in the present invention are well known in the art and may be selected from the group of precious metal complexes which include complexes of ruthenium, rhodium, palladium, osmium, iridium and platinum.

Additional epoxy functional silicone compositions suitable for use as component (A) in this invention include the type disclosed in U.S. Pat. No. 4,279,717 (Eckberg et al.), 4,576,999 (Eckberg), 4,558,082 (Eckberg), and 4,617,238 (Crivello et al.) herein incorporated by reference.

Acrylic-based polymers are also suitable for use in the composition of the present invention. Examples of suitable acrylic-based polymers include, for example, glycidyl acrylate and glycidyl methacrylate polymers and copolymers.

During the hydrosilation reaction, it is common to find residual amounts of Si-H functional siloxane left after the reaction has ceased. This residual Si-H functional siloxane may be used as component (B) in the composition of the present invention. Also, additional Si-H functional siloxane may be added to increase reaction rates. Although the Si-H functional material may be a silane, it is most advantageous to use an Si-H functional polysiloxane linear polymer.

Thus, one embodiment of the present invention utilizes an Si-H functional linear polysiloxane polymer represented by the formula:

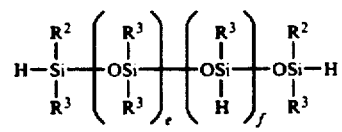

wherein $R^2$ is a monovalent hydrocarbon radical; $R^3$ is selected from the class consisting of monovalent hydrocarbon radicals; "e" varies from 1 to about 1,000; and "f" varies from about 5 to about 200. More preferably, "e" varies from about 10 to about 500 and "f" varies from about 5 to about 200. Such a polymer is taught by Jeram et al. in U.S. Pat. No. 3,884,866; Lee et al. in U.S. Pat. No. 4,162,243; and Sweet in U.S. Pat. No. 4,427,801; hereby incorporated by reference.

Another embodiment of the present invention utilizes cyclic silicone hydrides. Such cyclic silicone hydrides are well known in the art and may be represented by the formula:

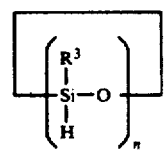

wherein $R^3$ is as previously defined and "n" is from about 2 to about 12.

Such cyclic silicone hydrides are disclosed in U.S. Pat. No. 4,743,377 (Ohtsu et al.), herein incorporated by reference.

The catalyst which may be used to effect the final cure of the heterocyclic polymers and residual silicon hydrides may be any suitable platinum catalyst. Such catalysts are well known in the art. Examples of suitable catalysts are taught by Lamoreaux in U.S. Pat. Nos. 3,917,432; 3,197,433; and 3,220,972; and by Karstedt in U.S. Pat. Nos. 3,715,334 and 3,814,730; and by Ashby et al. in U.S. Pat. No. 4,288,345; hereby incorporated by reference. The preferred catalysts are those described in the Lamoreaux and Karstedt patents. The catalyst described in the patents to Lamoreaux is a complex formed from chloroplatinic acid with up to 2 moles per gram of platinum a member selected from the class consisting of alcohols, esters, aldehydes and mixtures of the above.

The platinum catalyst disclosed in the patent to Karstedt, U.S. Pat. No. 3,814,730 is a platinum-siloxane complex containing less than about 0.1 gram atom of halogen per gram atom of platinum. It is prepared by reacting a platinum halide, preferably chloroplatinic acid, and an unsaturated siloxane, preferably sym-tetramethyldivinyldisiloxane, and is sometimes referred to herein as "Karstedt's catalyst."

The platinum catalyst can be present in an amount sufficient to provide at least one part by weight of platinum for every one million parts by weight of component A. It is preferred to use sufficient catalyst so that there is present from 5 to 50 parts by weight platinum for every one million parts by weight of component A. Most preferably, the platinum catalyst is present in an amount sufficient to provide about 5 to about 10 parts by weight of platinum for every one million parts by weight of component A.

It is understood that amounts greater than 50 parts per million are also effective but are unnecessary and wasteful, especially when the preferred catalyst is used.

The process for producing a platinum-catalyzed heterocyclic organic polymer composition involves mixing at least one heterocyclic organic polymer, a Si-H functional silicon compound, and a platinum catalyst. Best results are obtained from mildly heating the composition from room temperature to less than 120° C., preferably 65° C. to 75° C.

It should be noted that, over time, the residual platinum hydrosilation catalyst and the residual Si-H groups of the silicone hydride lead to a reaction between the oxirane rings of the heterocyclic polymer and premature crosslinking which results in the formation of gels. One must be careful, therefore, when using platinum to react ethylenically unsaturated organic heterocyclic polymers with Si-H containing silicones by hydrosilation to produce component (A). The reaction preference is between the unsaturated bond and the Si-h compound, but as the concentration of double bonds decreases the oxirane rings of the resultant heterocyclic functional polymer may react and ultimately polymerize. Whether the heterocyclic groups will react with residual Si-H groups is dependent upon the residual concentrations of Si-H and catalyst. Thus, in order to avoid shelf stability problems it may be necessary to either remove the residual Si-H functional compound or stabilize the composition by inhibiting the platinum catalyst from initiating the oxirane ring opening polymerization reaction. On the other hand, if the heterocyclic polymer is to be polymerized shortly after completing the hydrosilation reaction, stabilization may not be necessary. Thus, the polymers containing heterocyclic groups may be polymerized to final cure by simply adding additional platinum catalyst to cause the heterocyclic groups to react with any residual and/or additional silicon hydride groups.

The composition and method of the present invention are useful in numerous applications. Two component curing systems may be designed in which the heterocyclic polymer is first mixed with a catalyst amount of an active platinum compound. Then, on addition of the Si-H functional silicon compound, cure takes place. Such two component cure systems are useful in the elastomers, including RTVs, in adhesives, in composites such as circuit boards, filaments wound structures, pultrusions, particularly in reaction injection molding (RIM) and liquid injection molding (LIM), in compression, transfer and injection molding compounds, and in electrical and electronic encapsulations.

In order that those skilled in the art will be better able to practice the invention, the following examples are given for illustrative purposes are not intended to limit the scope of the invention.

EXPERIMENTAL

EXAMPLE 1

One hundred (100) grams of sym-bis(2-(7-oxabicyclo-[4.1.0]hept-3-yl)ethyl)tetramethyldisiloxane was weighed into a 500 ml flask with 0.2 g of the platinum catalyst. $H_2PtCl_6$ in octanol ("Lamoreaux's catalyst"), and 50 g of toluene. The reaction was heated to 65° C. and a slow dropwise addition of a silicone hydride fluid was started. After 2 g of the hydride fluid (having 1.2% by weight H) had been added the reaction temperature rose to greater than 120° C. and the reaction contents gelled to a solid, resin-like material. This material was insoluble in refluxing toluene.

EXAMPLE 2

In order to fully investigate the interaction of platinum and a hydride fluid (1.2% by weight H), the following experiment was done: 100 g of silicon hydride fluid was weighed into a 500 ml flask with 0.2 g of the platinum catalyst of Example 1 and 50 ml of toluene. The reaction was heated to and maintained at 65° C. No reaction occurred. A slow, dropwise addition of the epoxy silicone fluid of Example 1 was started. After 50 g of the epoxy silicone fluid had been added, the reaction contents gelled. This reaction indicates that a curing or crosslinking interaction occurs between the silicon hydride fluid and the epoxy units.

Examples 1 and 2 indicate that a curing reaction occurs between a siloxane hydride fluid and an epoxysilicone fluid in the presence of a catalytic amount of a platinum complex at low temperatures.

EXAMPLES 3-20

Examples 3-20 illustrate the usefulness of a wide variety of epoxy compounds, hydrogen functional silicon compounds, and platinum- containing catalysts in the method of the present invention.

The epoxy compounds, hydrogen functional silicon compounds, and platinum-containing catalysts used in Examples 3-20 are indicated in Table 1 below.

In these examples, 0.25 g of the hydrogen functional silicon compound was added to 2.5 g of the epoxy monomer and the resulting mixture stirred to dissolve the two components. One drop of the platinum-containing catalyst was then added to and dispersed in the first two components. The cure behavior of the mixture is described in Table 1.

TABLE 1

| | | Platinum Catalyzed Cure of Epoxies | | |
|---|---|---|---|---|
| Example No. | Epoxy Compound | Hydrogen Functional Silane | Platinum Catalyst | Cure-Comments |
| 3 | VCHDO | TMDS | K | immediate exothermic cure |
| 4 | VCHDO | TMDS | L | immediate exothermic cure |
| 5 | VCHDO | TMDS | A | slow cure, gelation after 12 hr |
| 6 | VCHDO | TMDS | S | rapid exothermic cure |
| 7 | LDO | TMDS | K | immediate exothermic cure |
| 8 | VCHDO | SC 4300 | K | |
| 9 | CHO | TMDS | L | immediate exothermic cure |
| 10 | CHO | TMDS | L | immediate exothermic cure |
| 11 | VCHDO | 2,4,6,8-tetramethyl-cyclotetrasiloxane | K | exothermic cure after 15 sec. |
| 12 | VCHDO | methyldimethoxy | K | immediate exothermic cure |

TABLE 1-continued

| | | Platinum Catalyzed Cure of Epoxies | | |
|---|---|---|---|---|
| Example No. | Epoxy Compound | Hydrogen Functional Silane | Platinum Catalyst | Cure-Comments |
| 13 | VCHDO | silane methyldiethoxy silane | K | slow cure overnight |
| 14 | VCHDO | triethylsilane | K | immediate exothermic cure |
| 15 | epichlorohydrin | TMDS | K | fast polymerization |
| 16 | CY 179 | TMDS | K | immediate exothermic cure |
| 17 | CY 179 | SC 4300 | K | gelation after 1 hr |
| 18 | BPADGE | TMDS | K | slow cure at R.T. fast cure at 100° C. |
| 19 | VCHMO | TMDS | K | rapid exothermic gelation |
| 20 | VCHMO | SC 4300 | L | rapid exothermic gelation |

VCHDO-4-vinylcyclohexene dioxide, VCHMO-vinylcyclohexene monoxide, LDO-limonene dioxide, CHO-cyclohexene dioxide, CY 179-3,4-epoxycyclohexylmethyl-3',4'-epoxycyclohexane carboxylate, BPADGE-bisphenol A diglycidyl ether, TMDS-1,1,3,3-tetramethyldisiloxane, SC-4300-SPD poly(methylhydrosiloxane), K-Karstedt catalyst, L-Lamoreaux catalyst, A-Ashby catalyst, S-Speier catalyst.

EXAMPLE 21

This example illustrates the applicability of the method of the present invention to a lactone monomer.

0.25 g of 1,1,3,3-tetramethyldisiloxane were added to 3.3 g of epsilon-caprolactone. One drop of Karstedt's catalyst was added to the resulting mixture. Heat evolution, together with a pronounced increase in viscosity, occurred as the polymerization progressed.

Examples 22-24 illustrate the applicability of the method of the present invention to various epoxy polymers.

EXAMPLE 22

Placed in a small vial were 2.5 g of an epoxy functional silicone resin prepared by reacting a trimethylsilane terminated copolymer containing on the average 3 methylhydrosiloxy segmer units to 20 dimethylsiloxy segmer units with 4-vinylcyclohexene monoxide under hydrosilylation conditions. The resulting epoxy functional polymer was combined with 0.25 g of 1,1,3,3-tetramethyldisiloxane and one drop of Karstedt's catalyst. Instant gelation of the resin occurred on mixing.

EXAMPLE 23

2.5 g of the epoxy functional polymer described in Example 21 above were combined with one drop of Karstedt's catalyst in a small vial. To this mixture was added 0.25 g of trimethyl stopped poly(methylhydrogen siloxane)fluid. Immediate gelation occurred together with the exothermic generation of heat. This example exemplifies the design of a two component epoxy curing mixture potentially useful as a sealant.

EXAMPLE 24

0.25 g of 1,1,3,3-tetramethyldisiloxane were added, with stirring, to 2.5 g poly(butadiene oxide). One drop of Karstedt's catalyst was then added to the mixture. Considerable outgasing of hydrogen occurred, accompanied by a slight rise in temperature to approximately 30° C. Warming to 40° C. produced a crosslinked polymer.

EXAMPLE 25

1.0 g of 3,3-bischloromethyloxetane and 0.1 g of 1,1,3,3-tetramethyldisiloxane were combined in a small reaction vessel. 50 microliters of Karstedt's catalyst was added to the mixture. Exothermic polymerization occurred along with an increase in viscosity. The reaction mixture was warmed slightly to complete the reaction. Low molecular weight oligomers of poly(3,3-bischloromethyloxetane) were obtained.

Examples 26-28 illustrate the use of inhibitors and/or retarders in the polymerizations carried out according to the method of this invention.

EXAMPLE 26

A mixture of 2.5 g of 4-vinylcyclohexene dioxide and 0.25 g of 1,1,3,3-tetramethyldisiloxane were placed in a small reaction tube. 0.05 g of acetonitrile were added with stirring to the mixture, followed by the addition of one drop of Karstedt's catalyst. Instead of the usual extremely rapid and exothermic polymerization, the solution showed no signs of polymerization even after 1 hour at room temperature. Further, no gelation was observed even after 0.5 hours at 100° C.

EXAMPLE 27

0.15 g of 1,1,3,3-tetramethyldisiloxane and 1 drop of Karstedt's catalyst were added to 2.5 grams of 4-vinylcyclohexene dioxide. Rapid exothermic cure of the solution occurred. The experiment was repeated with the addition of 0.05 g of methanol. On standing, a pale yellow solution was obtained. No gelation was observed. The mixture was heated in a water bath at 100° C. whereupon gelation occurred exothermically with foaming within 3 minutes.

EXAMPLE 28

2.5 g of 4-vinylcyclohexene dioxide, 0.25 g of 1,1,3,3-tetramethyldisiloxane, and one drop of Karstedt's catalyst were combined. Upon mixing, the components spontaneously and exothermically polymerized. A second mixture, containing the above components and 0.05 g of 2-methyl-1-butene-3-yne, was stable at room temperature. The latter mixture gave a crosslinked polymer when heated at 100° C. in a water bath for 30 minutes.

EXAMPLE 29

0.1 g of 1,1,3,3-tetramethyldisiloxane, followed by one drop of Karstedt's catalyst, were added to 2.5 g of an alpha, omega-difunctional epoxy polysiloxane resin, the silicone portion of the resin having a degree of polymerization of 61. Rapid gelation occurred with the formation of an elastomeric material.

What is claimed is:

1. A curable composition consisting essentially of:

A. a heterocyclic compound selected from the group consisting of epoxy-functional acrylic polymers, monomers selected from the group consisting of tetrahydrofurans, 3,3-bischloromethyloxetanes, lactones, spirocarbonates, spiroesters, cyclic sulfur compounds, lactams, ethyleneimines, and epoxy-functional silicones having the general formula:

wherein each R is, individually, a substituted or unsubstituted alkyl group having from about 1 to about 12 carbon atoms; each $R^1$ is, individually, a monovalent epoxy functional organic radical having from about 2 to about 20 carbon atoms; "a" is from about 0 to about 3; "b" is from about 0 to about 3; "x" is from about 1 to about 15; and "y" is from about 1 to about 200;

B. an Si-H functional silicon compound; and
C. a platinum catalyst.

2. The composition of claim 1 wherein R is a methyl radical, $R_1$ is a monovalent epoxy functional organic radical derived from vinyl cyclohexene monoxide; "a" is 1; "b" is 1; "x" is from 1 to about 10; and "y" is from about 10 to about 100.

3. The composition of claim 2 wherein "x" is from 1 to about 5; and "y" is from about 20 to about 80.

4. The composition of claim 1 wherein component A is a glycidyl acrylate polymer or a glycidyl methacrylate polymer, or a copolymer thereof.

5. The composition of claim 1 wherein the Si-H functional silicon compound is an Si-H functional linear polysiloxane polymer represented by the formula:

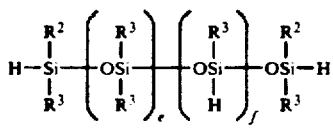

wherein $R^2$ is selected from the group consisting of hydrogen and monovalent hydrocarbon radicals; $R^3$ is a monovalent hydrocarbon radical; "e" varies from 1 to about 1,000; and "f" varies from about 5 to about 200.

6. The composition of claim 1 wherein the Si-H functional silicon compound is a cyclic silicone hydride represented by the formula:

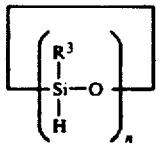

wherein $R^3$ is a monovalent hydrocarbon radical and "n" is from about 2 to about 12.

7. The composition of claim 1 wherein component A is a fluid.

8. The composition of claim 1 wherein the catalyst is a complex formed from chloroplatinic acid with up to 2 moles per gram of platinum of a member selected from the class consisting of alcohols, ethers, aldehydes and mixtures of the above.

9. The composition of claim 1 wherein the catalyst is a platinum-siloxane complex containing less than about 0.1 gram atom of halogen per gram atom of platinum.

10. The composition of claim 1 wherein the platinum catalyst is present in an amount sufficient to provide at least one part by weight of platinum for every one million parts by weight of component A.

11. The composition of claim 10 wherein the platinum catalyst is present in an amount sufficient to provide 5 to 50 parts by weight of platinum for every one million parts by weight of component A.

12. The composition of claim 11 wherein the platinum catalyst is present in an amount sufficient to provide about 5 to about 10 parts by weight of platinum for every one million parts by weight of component A.

13. A method for polymerizing an organic heterocyclic polymer, consisting essentially of mixing an Si-H functional siloxane and a platinum catalyst with at least one heterocyclic compound selected from the group consisting of epoxy-functional acrylic polymers and monomers selected from the group consisting of lactam, tetrahydrofuran, 3,3-bischloromethyloxetanes, lactones, spirocarbonates, spiroesters, cyclic sulfur compounds, ethyleneimines, and epoxy-functional silicones having the general formula:

wherein each R is, individually, a substituted or unsubstituted alky group having from about 1 to about 12 carbon atoms; each $R^1$ is, individually, a monovalent epoxy functional organic radical having from about 2 to about 20 carbon atoms; "a" is from about 0 to about 3; "b" is from about 0 to about 3; "x" is from about 1 to about 15; and "y" is from about 1 to about 200.

14. The method of claim 13 wherein component A is an epoxy-functional polydiorganosiloxane silicone.

15. The method of claim 14 wherein the epoxy-functional silicone has the general formula:

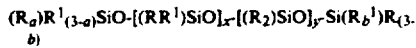

wherein each R is, individually, a substituted or unsubstituted alkyl group having from about 1 to about 12 carbon atoms; each $R^1$ is, individually, a monovalent epoxy functional organic radical having from about 2 to about 20 carbon atoms; "a" is from about 0 to about 3; "b" is from about 0 to about 3; "x" is from about 1 to about 15; and "y" is from about 1 to about 200.

16. The method of claim 15 wherein R is a methyl radical, $R_1$ is a monovalent epoxy functional organic radical derived from vinyl cyclohexene monoxide; "a" is 1; "b" is 1; "x" is from 1 to about 10; and "y" is from about 10 to about 100.

17. The method of claim 16 wherein "x" is from 1 to about 5; and "y" is from about 20 to about 80.

18. The method of claim 13 wherein the Si-H functional silicon compound is an Si-H functional linear polysiloxane polymer represented by the formula:

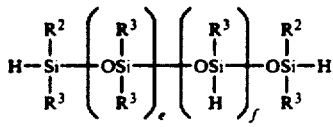

wherein $R^2$ is selected from the group consisting of hydrogen and monovalent hydrocarbon radicals; $R^3$ is a monovalent hydrocarbon radical; "e" varies from 1 to about 1,000; and "f" varies from about 5 to about 200.

19. The method of claim 18 wherein the Si-H functional silicon compound is a cyclic silicone hydride represented by the formula:

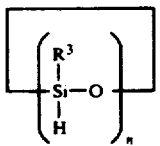

wherein $R^3$ is a monovalent hydrocarbon radical and "n" is from about 2 to about 12.

20. The method of claim 13 wherein the catalyst is a complex formed from chloroplatinic acid with up to 2 moles per gram of platinum of a member selected from the class consisting of alcohols, ethers, aldehydes and mixtures of the above.

21. The method of claim 13 wherein the catalyst is a platinum-siloxane complex containing less than about 0.1 gram atom of halogen per gram atom of platinum.

22. The method of claim 13 wherein the platinum catalyst is present in an amount sufficient to provide at least one part by weight of platinum for every one million parts by weight of component A.

23. The method of claim 22 wherein the platinum catalyst is present in an amount sufficient to provide about 5 to about 50 parts by weight of platinum for every one million parts by weight of component A.

24. The method of claim 23 wherein the platinum catalyst is present in an amount sufficient to provide about 5 to about 10 parts by weight of platinum for every one million parts by weight of component A.

25. The method of claim 13 further comprising the step of heating the mixture containing the heterocyclic polymer, the Si-H functional silicon compound, and the platinum catalyst to less than 120° C.

26. The method of claim 25 wherein the mixture is heated from about 65° C. to about 75° C.

27. The method of claim 13 wherein the heterocyclic compound is a fluid.

* * * * *